United States Patent
Tamura et al.

(10) Patent No.: US 6,222,701 B1
(45) Date of Patent: Apr. 24, 2001

(54) MAGNETIC HEAD WITH (411) PLANE SINGLE CRYSTAL FERRITE MEDIUM FACING SURFACE AND (122) PLANE GAP SURFACE

(75) Inventors: Takashi Tamura; Yukari Nihei; Atsushi Suzuki; Toru Matsunaga; Akira Urai, all of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/992,184

(22) Filed: Dec. 17, 1997

(30) Foreign Application Priority Data

Dec. 25, 1996 (JP) .................................................. 8-346109

(51) Int. Cl.⁷ .................................................. G11B 5/127
(52) U.S. Cl. .................................................. 360/127; 360/122
(58) Field of Search .................................................. 360/122, 126, 360/127, 125

(56) References Cited

U.S. PATENT DOCUMENTS

| | | | |
|---|---|---|---|
| 3,674,944 | * 7/1972 | Iemura et al. | 360/127 |
| 3,810,245 | 5/1974 | Ozawa et al. | 360/127 |
| 4,787,004 | 11/1988 | Akiho et al. | 360/127 |
| 5,107,382 | * 4/1992 | Matsuzawa et al. | 360/122 |
| 5,218,500 | * 6/1993 | Okuda et al. | 360/126 |
| 5,222,006 | * 6/1993 | Yanagi | 360/126 |
| 5,270,894 | * 12/1993 | Okuda et al. | 360/126 |
| 5,515,222 | * 5/1996 | Kumagai et al. | 360/127 |

FOREIGN PATENT DOCUMENTS 62-119713   1/1987   (JP) .

OTHER PUBLICATIONS

Patent Abstracts of Japan, vol. 11, No. 337 (P–633), Nov. 5, 1987 & JP 62 119713 A (Matsushita Electric Ind. Co., Ltd.) Nov. 20, 1985.

Derwent Publications, Ltd., Database WPI, Section Ch. Week 8727, London, GB, AN 87–189367, XP002092310.

* cited by examiner

Primary Examiner—Brian E. Miller
(74) Attorney, Agent, or Firm—Hill & Simpson

(57) ABSTRACT

A magnetic head having excellent abrasion characteristics and a high playback output. The magnetic head is made up of a pair of magnetic core halves each having a single crystal ferrite at a portion thereof, said magnetic core halves being abutted and joined to each other, with a magnetic gap being formed between abutment surfaces of these magnetic core halves. The single crystal ferrite has its medium sliding surface, slidingly contacted with a magnetic recording medium, as a (411) plane, and also has the abutment surface as a (122) plane.

1 Claim, 3 Drawing Sheets

MAGNETIC HEAD WITH (411) PLANE SINGLE CRYSTAL FERRITE MEDIUM FACING SURFACE AND (122) PLANE GAP SURFACE

BACKGROUND OF THE INVENTION

1. Field of the Invention

This invention relates to a novel magnetic head used for a magnetic recording/reproducing apparatus, such as a video tape recorder. More particularly, it relates to a novel magnetic head improved in the playback output and abrasion resistance.

2. Description of Related Art

In a magnetic recording/reproducing apparatus, researches into increasing the recording density or the transfer rate are proceeding. Specifically, in recent magnetic recording/reproducing apparatus, the magnetic wavelength is less than 1 μm, the relative velocity between the magnetic head and the magnetic recording medium is not lower than 5 m/s and the maximum frequency during recording/reproduction is not less than 10 MHz.

Up to now, a magnetic head shown in FIG. 1 or in FIG. 2 is used for the above-described magnetic recording/reproducing apparatus. The magnetic head shown in FIG. 1 has the plane orientation of a magnetic core in the so-called VHS orientation, while the magnetic head shown in FIG. 2 is such a magnetic head having the plane orientation of a magnetic core in the so-called β-orientation.

This type of the magnetic head is made up of a first magnetic core half 13m and a second magnetic core half 13n abutted and connected to each other so that a magnetic gap g1 is defined between the abutting surfaces thereof. The first magnetic core half 13m is made up of a single-crystal ferrite 11m and a polycrystal ferrite 12m joined together, while the second magnetic core half 13n is made up of a single-crystal ferrite 11n and a polycrystal ferrite 12n joined together.

That is, in these magnetic heads, the sides of the magnetic core halves 13m, 13n towards a medium sliding surface 11a defining the magnetic gap g1 are formed by single crystal ferrites 12m, 12n, while the bottom side of the magnetic head is formed by the polycrystal ferrites 11m, 11n. These magnetic core halves are formed so that the position of the magnetic gap g1 formed at the junction between the magnetic core halves 13m, 13n integrated to each other is coincident with the position of the top of the single crystal ferrites 11m, 11n in the medium sliding surface (R-TOP) so that the magnetic recording medium is contacted with the magnetic gap g1.

With the magnetic head of the VHS orientation, shown in FIG. 1, the single ferrite cores 11m, 11n are arranged so that the medium sliding surface is on the (211) plane and the abutment surface 11b of the magnetic core halves 13m, 13n is on the (111) plane.

In the magnetic head having the VHS orientation, the single crystal ferrites 11m, 11n, making up the magnetic core halves 13m, 13n, are arranged so that the directions of the <100> crystal axis orientations B1, B2 within the (110) plane in the lateral side of the magnetic head will be symmetrical with respect to the magnetic gap g1. This assures superior playback characteristics especially in the high frequency range.

However, the magnetic head having the crystal axis orientation of the single crystal ferrites 13m, 13n arrayed in this manner tends to be worn out more readily than the magnetic head having the β-orientation, such that it has only a short service life as a magnetic head. Moreover, since the <100> crystal axis orientations B1, B2 within the (110) plane on the lateral side 11c of the magnetic head are symmetrical with respect to the magnetic gap g1, the single crystal ferrite 11m of the first magnetic core half 13m has the resistance against abrasion with respect to the magnetic recording medium different from that of the single crystal ferrite 11n making up the second magnetic core half 13m. Therefore, if the medium sliding surface 11a is worn out due to repeated sliding operations of the magnetic recording medium, the medium sliding surface 11a is not uniformly worn out, but undergoes partially proceeding abrasion.

If partially proceeding abrasion occurs, the top (R-TOP) of the single crystal ferrites 11m, 11n and the magnetic gap g1 become non-coincident with each other on the medium sliding surface 11a thus deteriorating the abutting contact of the magnetic head with the magnetic recording medium. If the magnetic recording medium has sliding contact with the magnetic head further, the partially advancing abrasion is increased further until ultimately the magnetic recording medium ceases to be contacted with the portion of the magnetic head around the magnetic gap g1. This seriously lowers the playback output especially in the high frequency range due to the effect of the spacing loss.

On the other hand, the magnetic head having the β-orientation as shown in FIG. 2 is less susceptible to abrasion as compared to the magnetic head having the VHS orientation shown in FIG. 1 and hence has a longer service life as a magnetic head. Moreover, with the magnetic head having the β-orientation, the single crystal ferrites 11m, 11n constituting the magnetic core halves 13m, 13n are arranged so that the single crystal ferrites 11m, 11n making up the magnetic core halves 13m, 13n will have the same directions of the <100> crystal axis B1, B2 in the (110) plane on the lateral side 11c of the magnetic head, as shown in FIG. 1. Therefore, the single crystal ferrite 11m of the first magnetic core half 13m has the same resistance against abrasion with respect to the magnetic recording medium as that of the single crystal ferrite 11n of the second magnetic core half 13n. Thus, the magnetic head having the β-orientation is not subjected to the partial proceeding abrasion as seen in the magnetic head having the VHS orientation. That is, the magnetic head having the β-orientation exhibits superior resistance against abrasion. However, the magnetic head having the β-orientation has poor playback performance and is low in particular in the playback output in the high frequency range.

As described above, the magnetic head having the VHS orientation is superior in playback output but inferior in resistance against abrasion, whilst the magnetic head having the β-orientation is superior in resistance against abrasion but cannot develop a superior playback output. Thus, with the conventional magnetic head, the abrasion characteristics and the playback output cannot be optimized simultaneously, such that only one of the abrasion characteristics and the playback output can be improved at the cost of the other.

SUMMARY OF THE INVENTION

It is therefore an object of the present invention to provide a magnetic head which can satisfy the demand for high abrasion characteristics and high playback output simultaneously.

The magnetic head according to the present invention is made up of a pair of magnetic core halves each having a single crystal ferrite at a portion thereof. The magnetic core halves are abutted and joined to each other, with a magnetic gap being formed between abutment surfaces of these magnetic core halves. The single crystal ferrite has its medium sliding surface slidingly contacted with a magnetic recording medium, as a (411) plane, and also has the abutment surface as a (122) plane. Preferably, magnetic core halves are each formed by a junction ferrite comprised of the single crystal ferrite bonded to a polycrystal ferrite.

With the magnetic head of the present invention, since the surface orientation of the single crystal ferrite is set so that its medium sliding surface contacted with the magnetic recording medium is set as the (411) plane and the abutting surface of the magnetic core halves is set as the (122) plane, it becomes possible to realize good abrasion characteristics and a high playback output simultaneously. That is, the present invention provides a magnetic head which is free from deterioration in the playback output ascribable to partial advancing abrasion and which can produce a high playback output.

DESCRIPTION OF PREFERRED EMBODIMENTS

Figure 1:
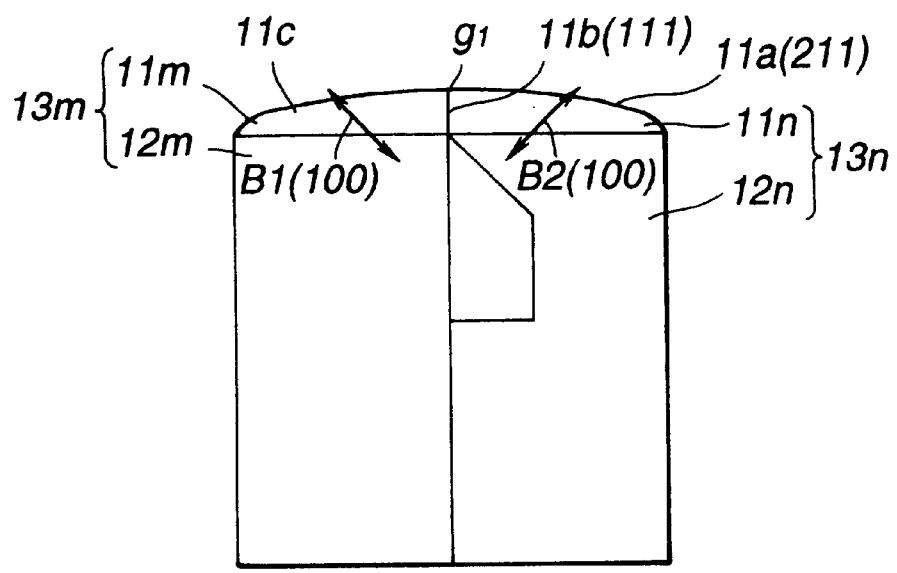
FIG. 1 is a schematic cross-sectional view showing an example of a conventional magnetic head having the VHS-orientation.

Referring to the drawings, a preferred embodiment according to the present invention will be explained in detail. The present invention, however, is not limited to the embodiment illustrated and can be optionally modified within the scope of the invention.

Figure 4:
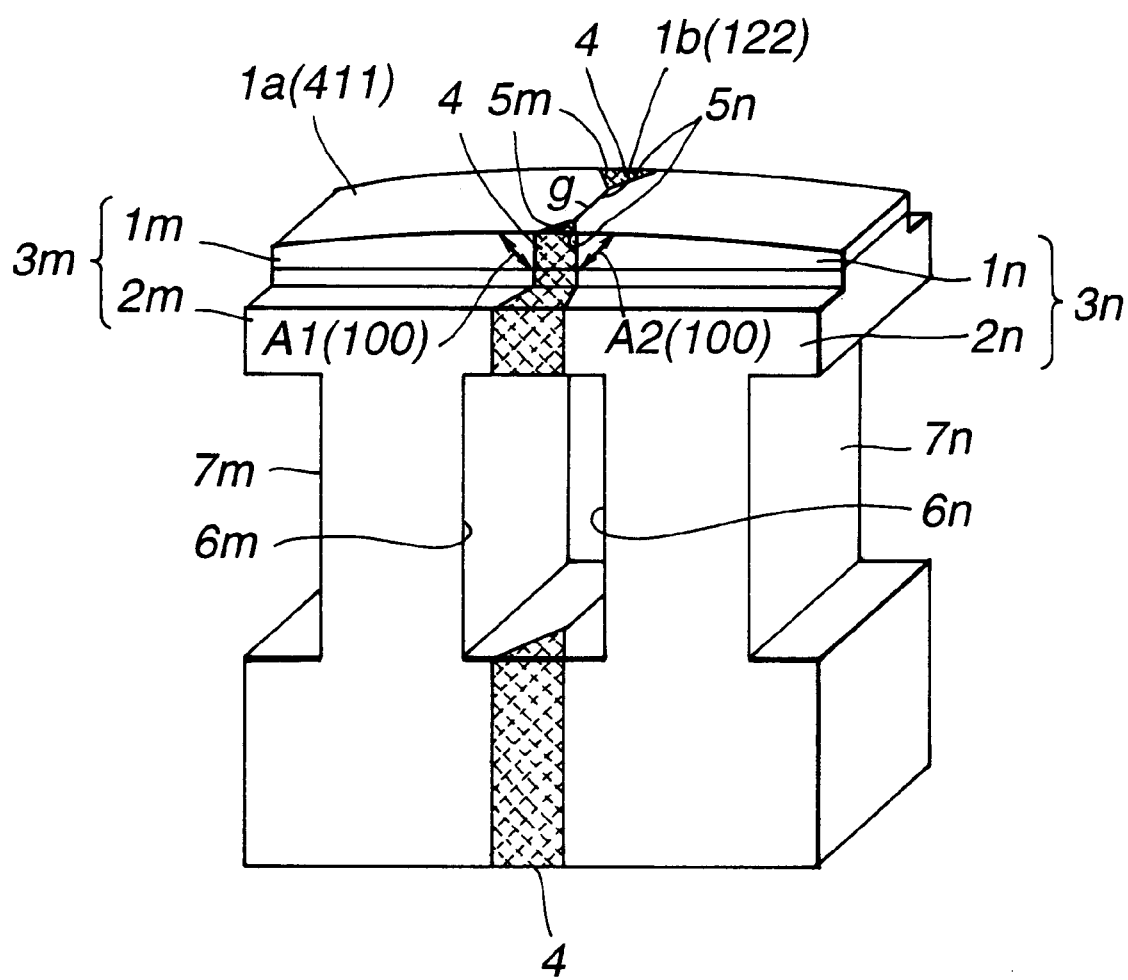
FIG. 4 is a schematic cross-sectional view showing an example of a magnetic head according to the present invention.

Referring to FIG. 4, a first magnetic core half 3m and a second magnetic core half 3n are abutted and joined to each other by fused glass 4. The first magnetic core half 3m is comprised of a junction ferrite made up of a singe crystal ferrite 1m and a polycrystal ferrite 2m joined together, while the second magnetic core half 3n is comprised of a junction ferrite made up of a single crystal ferrite In and a polycrystal ferrite 2n joined together similarly to the first magnetic head 3m. The magnetic core halves 3m, 3n, thus joined together, complete a closed magnetic path, with a magnetic gap g having a pre-set azimuth angle being formed between abutment surfaces of the magnetic core halves 3m, 3n.

The above magnetic core halves 3m, 3n are formed so that the magnetic gap g formed at the junction portion of the magnetic core halves 3m, 3n and the top R-TOP of the medium sliding surface will coincide with each other so that the magnetic recording medium will be contacted with the magnetic head on the magnetic gap g.

The first magnetic core half 3m is formed by a junction ferrite made up of the single crystal ferrite 1m and the polycrystal ferrite 2m joined together, as described above. The single crystal ferrite 1m is arranged on the side of the medium sliding surface la slidingly contacted with the magnetic recording medium. Similarly, the second magnetic core half 3n is formed by a junction ferrite made up of the single crystal ferrite In and the polycrystal ferrite 2n joined together, as described above. The single crystal ferrite 1n is arranged on the side of the medium sliding surface 1a slidingly contacted with the magnetic recording medium. That is, the sides of the magnetic core halves 3m, 3n towards the medium sliding surface 1a carrying the magnetic gap g are constituted by the single crystal ferrites 1m, 1n, while the sides thereof towards the bottom of the magnetic head are constituted by the polycrystal ferrites 2m, 2n. The single crystal ferrites 1m, 1n and the polycrystal ferrites 2m, 2n are preferably formed of Mn—Zn ferrite or Ni—Zn ferrite.

With the magnetic head according to the present invention, the single crystal 1m ferrites 1m, 1n of the magnetic core halves 3m, 3n are arranged so that the medium sliding surface 1 a slidingly contacted with the magnetic recording medium will be the (411) plane and the abutment surface between the first magnetic core half 3m and the second magnetic core half 3n will be the (122) plane. Also, these single crystal ferrites 1m, 1n are arranged so that the direction of the <100> crystal axis A1 of the single crystal 1m of the first magnetic core half 3m and the direction of the <100> crystal axis A2 of the single crystal 1n of the second magnetic core half 3n will be symmetrical with respect to the magnetic gap g. By arranging the plane orientation and the directions of the crystal axes of the single crystal ferrites 3m, 3n as described above, the demand for superior abrasion characteristics and that for a high playback output can be met simultaneously.

Also, in the above-described magnetic core halves 3m, 3n, the single crystal ferrites 1m, 1n and the polycrystals 2m, 2n are arranged so that the entire medium sliding surface 1a slidingly contacted with the magnetic recording medium will be constituted by the single crystal ferrites 1m, 1n, that is so that the polycrystal ferrites 2m, 2n will not be exposed to the medium sliding surface 1a. By having the polycrystal ferrites 2m, 2n not be exposed to the medium sliding surface 1a, the high playback output and excellent abrasion characteristics can be realized simultaneously. Also, in the above-mentioned magnetic core halves 3m, 3n, the single-crystal ferrites 1m, 1n are arranged only on the sides of the medium sliding surface 1a so that the polycrystal ferrites 2m, 2n will be more voluminous and the singe crystal ferrites 1m, 1n will be less voluminous. By so doing, it becomes possible to reduce the sliding noise generated on sliding the magnetic recording medium in contact with the magnetic head.

In the present magnetic head, a track width controlling groove track width controlling groove 5m is formed on each side of the magnetic gap g such that the side of the first magnetic core half 3m abutted against the second magnetic core half 3n is substantially frusto-conical in profile. Similarly, a track width controlling groove 5n is formed on each side of the magnetic gap g for controlling the track width of the magnetic gap g such that the side of the second magnetic core half 3n abutted against the first magnetic core half 3n is substantially frusto-conical in profile. That is, the abutting portions of the magnetic core halves 3m, 3n are substantially frusto-conical in profile, with the gap forming surface as a surface defining the magnetic gap g being formed as a portion corresponding to the upper surface of the frusto-conical shape and with the track width controlling grooves 5m, 5n positioned on the lateral side edges of the gap forming surface being formed as both lateral surfaces of the frusto-conical shape. The fused glass 4, used for joining the magnetic core halves 3m, 3n, is charged into these track width controlling grooves 5m, 5n.

In the abutment surfaces of the magnetic core halves 3m, 3n are formed winding slots 6m, 6n used for placing a coil therearound. That is, the first magnetic core half 3m is formed with a rectangular-shaped groove on the opposite side of the winding slot 6m in register with the winding slot 6m so that the groove will pass through the first core half 3m in the direction of the core thickness. Similarly, the second magnetic core half 3m is formed with a rectangular-shaped groove on the opposite side of the winding slot 7m in register with the winding slot 6m so that the groove will pass through the second core half 3n in the direction of the core thickness. When assembling the magnetic head on the magnetic recording/reproducing apparatus, the coil is placed in both the winding slots 6n, 7n. When reproducing signals from the magnetic recording medium, the signals recorded on the magnetic recording medium are taken out as electrical signals through the coil thus placed within the winding slots.

Figure 2:
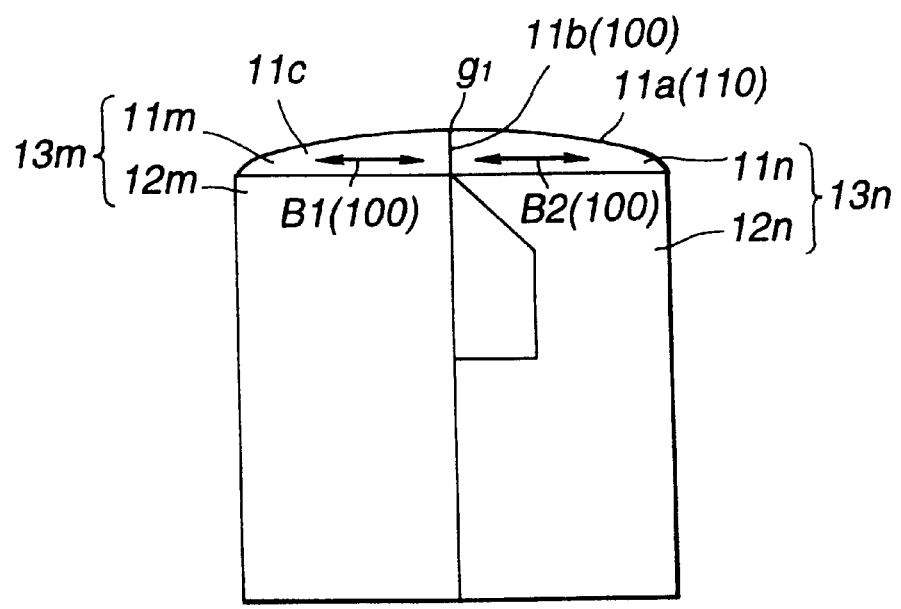
FIG. 2 is a schematic cross-sectional view showing an example of a conventional magnetic head having the β-orientation.
Figure 3:
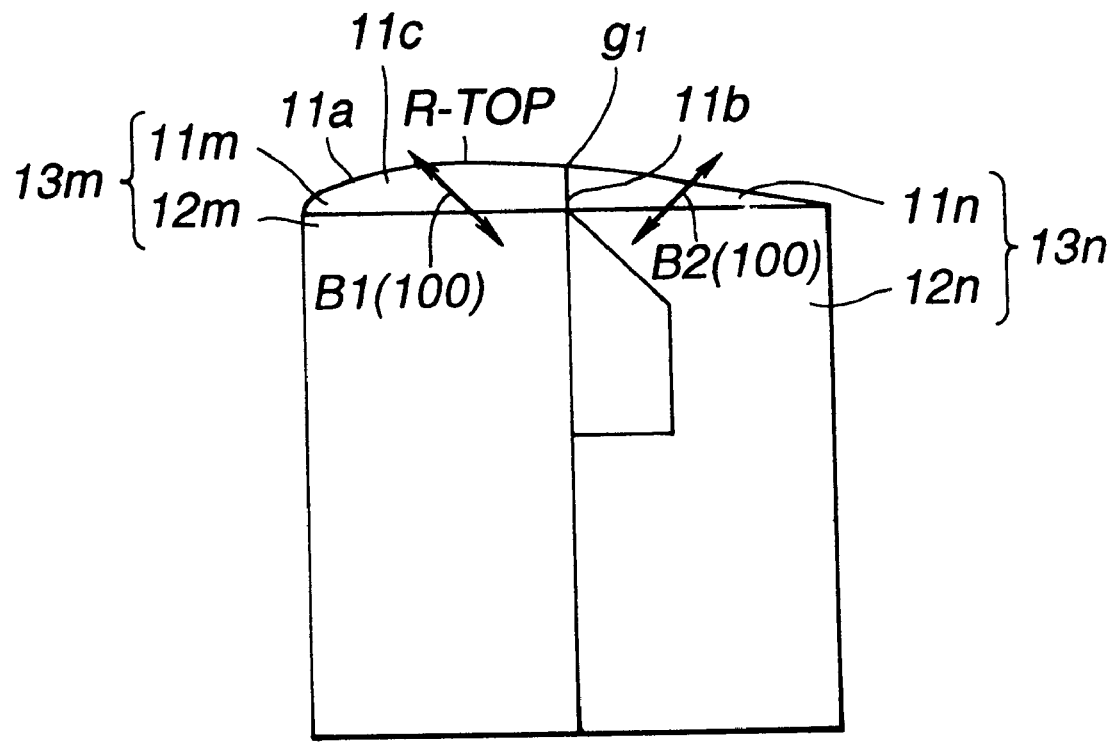
FIG. 3 is a schematic cross-sectional view showing a magnetic head which has undergone partially advancing abrasion.

The results of evaluation of the playback output and the abrasion characteristics of the above-described magnetic head are hereinafter explained in comparison with those of the magnetic head of the VHS orientation shown in FIG. 2 and the magnetic head of the β orientation shown in FIG. 3.

With the magnetic head being evaluated, the track width was set to 36 μm, the abutment width of the magnetic tape was set to 100 μm and the curvature R of the medium sliding surface was set to 8 mm. In measuring the playback output, a digital betacam tape manufactured by SONY CORPORATION was used as a magnetic recording medium. The relative velocity between the magnetic head and the magnetic tape was set to 22.5 m/s and the recording/reproducing frequency was set to 33 MHz.

In measuring abrasion characteristics, a betacam SP deck manufactured and sold by SONY CORPORATION under the trade name of BVW-50 was used as a magnetic recording/reproducing apparatus and a digital betacam tape manufactured and sold by SONY CORPORATION under the trade name of BCT-D94L was used as a magnetic recording medium. The magnetic tape was run for 200 hours under an environment of 25° C. and 80% RH as the magnetic tape was exchanged with new ones every 20 hours. The amount of abrasion of the medium sliding surface and the separation between the top R-TOP of the medium sliding surface and the magnetic gap were measured. The amount of R-TOP deflection was measured by an interference micrometer.

The measured results of the playback output and the abrasion characteristics are shown in Table 1.

|  | playback output | abrasion characteristics | |
|---|---|---|---|
|  |  | amount of abrasion | R-TOP offset |
| Ex. | +0.5 dB | 0.5 μm | 40 μm |
| Comp. Ex1 (VHS orientation) | 0 dB | 4.3 μm | 120 μm |
| Comp. Ex1 (β orientation) | −2.0 dB | 0.6 μm | 10 μm |

In the above Table, the Example means a magnetic head according to the present invention, Comp. Ex. 1 means a magnetic head having the VHS orientation, and Comp. Ex. 2 means a magnetic head having the β orientation. Also, in Table 1, the playback output is represented by a relative value with respect to the playback output of the conventional VHS orientation magnetic head which is set to 0 dB.

As may be seen from Table 1, it is possible with the magnetic head according to the invention to realize a playback output equivalent to or higher than that of the VHS orientation magnetic head showing excellent playback output in the high frequency range. Moreover, the amount of abrasion of the magnetic head according to the invention is equivalent to that of the magnetic head of the β-orientation having superior abrasion characteristics. In addition, the magnetic head according to the invention has both the high playback output and superior abrasion characteristics.

The present invention is particularly effective when applied to a magnetic head which has to meet severe demands in connection with the playback output and abrasion characteristics. Specifically, the present invention is particularly effective when applied to a magnetic head loaded on a magnetic recording/reproducing apparatus in which the recording wavelength is less than 1 μm, the relative velocity between the magnetic head and the magnetic recording medium not less than 5 m/sec and the maximum frequency for recording/reproduction not less than 10 MHz.

What is claimed is:

1. A magnetic head made up of a pair of magnetic core halves, each having a single crystal ferrite at a portion thereof, said magnetic core halves being abutted and joined to each other with a magnetic gap being formed between abutment surfaces thereof, characterized in that:

said single ferrite has a medium sliding surface with a (411) plane, and each of said abutment surfaces has a (122) plane, and said magnetic core halves are each formed by a junction ferrite comprised of said single crystal ferrite bonded to a polycrystal ferrite, said polycrystal ferrite being more voluminous than said single crystal ferrite.

* * * * *